United States Patent [19]

Kaneko et al.

[11] Patent Number: 5,607,216
[45] Date of Patent: Mar. 4, 1997

[54] PROJECTION DISPLAY APPARATUS

[75] Inventors: Toshihide Kaneko; Eiichi Toide, both of Nagaokakyo, Japan

[73] Assignee: Mitsubishi Denki Kabushiki Kaisha, Tokyo, Japan

[21] Appl. No.: 465,057

[22] Filed: Jun. 5, 1995

[30] Foreign Application Priority Data

Jun. 24, 1994 [JP] Japan .................................. 6-143410
Jul. 26, 1994 [JP] Japan .................................. 6-174467
Feb. 7, 1995 [JP] Japan .................................. 7-019231

[51] Int. Cl.⁶ ..................................................... G03B 21/14
[52] U.S. Cl. ........................................... 353/97; 348/781
[58] Field of Search ............................... 353/88, 75, 97; 348/740, 781; 359/739, 740, 738

[56] References Cited

U.S. PATENT DOCUMENTS

| | | | |
|---|---|---|---|
| 4,810,076 | 3/1989 | Murao et al. | 359/738 |
| 4,933,599 | 6/1990 | Fukuda | 348/781 |
| 5,210,645 | 5/1993 | Orino et al. | 359/738 |
| 5,371,559 | 12/1994 | San-Nohe et al. | 353/31 |
| 5,379,083 | 1/1995 | Tomita | 353/97 |
| 5,519,518 | 5/1996 | Watanabe et al. | 359/40 |

FOREIGN PATENT DOCUMENTS

| | | |
|---|---|---|
| 2-251808 | 10/1990 | Japan . |
| 3-274537 | 12/1991 | Japan . |
| 6-25105 | 6/1994 | Japan . |
| 6-258575 | 9/1994 | Japan . |

Primary Examiner—William Dowling

[57] ABSTRACT

A projection display apparatus comprises an image source having a rectangular image-displaying surface; a projecting lens assembly for magnifying and projecting the image onto a screen; and light-obstructing plate disposed in the vicinity of the nearest lens element of the projecting lens assembly to the image source. The light-obstructing plate is disposed in such a position that $0.1 \leq R_1/R_2 \leq 0.8$ where $R_1$ is a radius of optical-axis light which is emitted toward the screen from a central point on the image-displaying surface through which the optical axis of the projecting lens assembly passes, and $R_2$ is a radius of effective light which is emitted toward the screen from the image-displaying surface. The light-obstructing plate is provided with protrusions which are disposed at positions at a same distance from a first, or a second reference line on the light-obstructing plate so as to obstruct several pairs of flare beams, which are included in peripheral light emitted from the vicinity of four corners of the image-displaying surface and are traveling towards positions at a same distance from the first or the second reference line.

26 Claims, 16 Drawing Sheets a 28.5mm
b 18.9mm
c 9.5mm
d 6.0mm
e 10.0mm

PROJECTION DISPLAY APPARATUS

BACKGROUND OF THE INVENTION

This invention relates to a projection display apparatus that enlarges an image displayed on an image source such as a cathode ray tube (CRT), and projects it onto a screen. More particularly, this invention relates to an apparatus that can project a finely detailed, high contrast image on the screen.

FIG. 21 is a schematic diagram showing the construction of the image projecting part of a projection display apparatus described in the Japanese Patent Kokai Publication No. 258575/1994 (applicant: Mitshubishi Denki Kabushiki Kaisha). As shown in FIG. 21, the image projecting part comprises a CRT 3 having a faceplate 3f, a projecting lens assembly 4 comprising six lens elements (or lens groups) $L_1$–$L_6$, and a cooling fluid 6. In FIG. 21, $S_1$–$S_{12}$ indicate surfaces of each lens element $L_1$–$L_6$. In this image projecting part, a spot displayed at the center A of the faceplate 3f, through which an optical axis 5 of the projecting lens assembly 4 passes, is projected as a spot image, which almost perfectly resembles the image on the faceplate 3f, at the center $A_s$ of a screen as shown in FIG. 22.

However, in the aforesaid conventional projection display apparatus, due to off-axis aberrations such as coma or astigmatism, and to discrepancies when machining and assembling the lenses, a spot displayed in a corner B of the faceplate 3f of the CRT 3 is projected on the screen so that the projected image on the screen has the deformed and widened form shown as $B_s$ in FIG. 22. This causes the resolution of a projected image to decrease. Moreover, flare affects adjacent images, leading to local decrease of contrast of the projected image on the screen.

In a model representation of the image formed in the area $B_s$ of FIG. 22, two regions may be distinguished as shown in FIG. 23, viz. a region 31 where the light beam is relatively converged, and a region 32 where the aberration light (referred to hereinafter as flare) surrounding the region 31 is impinged. According to this model, the light intensity distributions in the meridional and sagittal directions are respectively 33M and 33S. The MTF (modulation transfer function) is obtained as the Fourier transform of the intensity distribution. Assuming the basic frequencies to be the same, the characteristics of the MTF 34M in the meridional direction are then superior to those of the MTF 34S in the sagittal direction, as shown in FIG. 24.

The Japanese Patent Kokai Publication No. 251808/1990, for example, proposes a means of overcoming this problem. According to this proposal, flare is screened out by providing an obstructing means in the projecting lens assembly. However, as the position of this obstructing means is not specified, it may obstruct light except for the flare, leading to a decrease of brightness of the projected image.

SUMMARY OF THE INVENTION

The purpose of this invention is to provide a projection display apparatus wherein resolution and contrast are improved while decrease of brightness is kept to a minimum.

According to one aspect of the present invention, a projection display apparatus comprises: an image source having a rectangular image-displaying surface, on which an image is formed; a projecting lens assembly, which includes a plurality of lens elements, for magnifying the image formed by the image source and projecting the image onto a screen; and light-obstructing plate disposed in the vicinity of the nearest lens element of the projecting lens assembly to the image source. The light-obstructing plate is disposed in such a position that $0.1 \leq R_1/R_2 \leq 0.8$ where $R_1$ is a radius of optical-axis light which is emitted toward the screen from a center on the image-displaying surface through which the optical axis of the projecting lens assembly passes, and $R_2$ is a radius of effective aperture through which light is emitted toward the screen from the image-displaying surface. The light-obstructing plate is provided with protrusions which are disposed at positions at a same distance from a first or a second reference line on the light-obstructing plate so as to obstruct several pairs of flare beams, which are included in peripheral light emitted from the vicinity of four corners of the image-displaying surface and are traveling towards positions at a same distance from the first or the second reference line, the first and the second reference lines corresponding to two diagonals on the screen respectively.

According to another aspect of the present invention, a projection display apparatus for displaying a color image on a screen, comprises a red image projecting part for projecting a red image on the screen, a green image projecting part for projecting a green image on the screen, and a blue image projecting part for projecting a blue image on the screen. At least one of the red image projecting part, the green image projecting part and the blue image projecting part comprises an image source having a rectangular image-displaying surface, on which an image is formed; a projecting lens assembly, which includes a plurality of lens elements, for magnifying the image formed by the image source and projecting the image onto a screen; and light-obstructing plate disposed in the vicinity of the nearest lens elements of the projecting lens assembly to the image source. The light-obstructing plate is disposed in such a position that $0.1 \leq R_1/R_2 \leq 0.8$ where $R_1$ is a radius of optical-axis light which is emitted toward the screen from a center on the image-displaying surface through which the optical axis of the projecting lens assembly passes, and $R_2$ is a radius of effective aperture through which light is emitted toward the screen from the image-displaying surface. The light-obstructing plate is provided with protrusions which are disposed at positions at a same distance from a first or a second reference line on the light-obstructing plate so as to obstruct several pairs of flare beams, which are included in peripheral light emitted from the vicinity of four corners of the image-displaying surface and are traveling towards positions at a same distance from the first or the second reference line, the first and the second reference lines corresponding to two diagonals on the screen respectively.

PREFERRED EMBODIMENTS OF THE INVENTION

Preferred embodiments of the projection display apparatus according to this invention will now be described with reference to the attached drawings.

Embodiment 1

Figure 1:
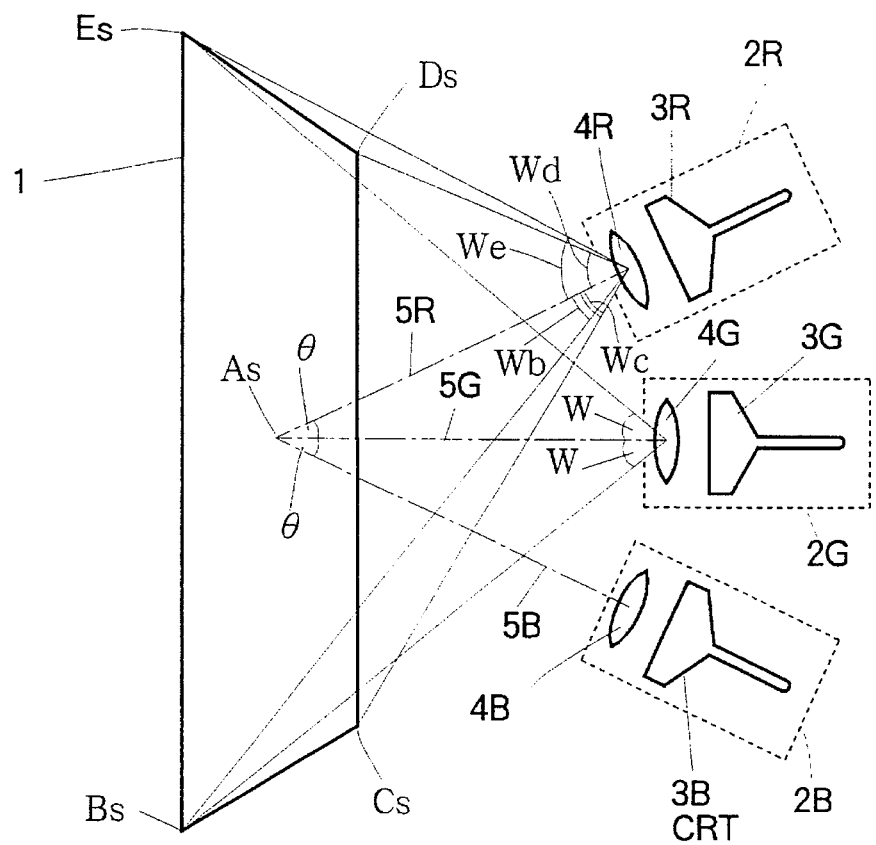
FIG. 1 is a plan view schematically showing the construction of a projection display apparatus for displaying the color image on the screen.
Figure 2:
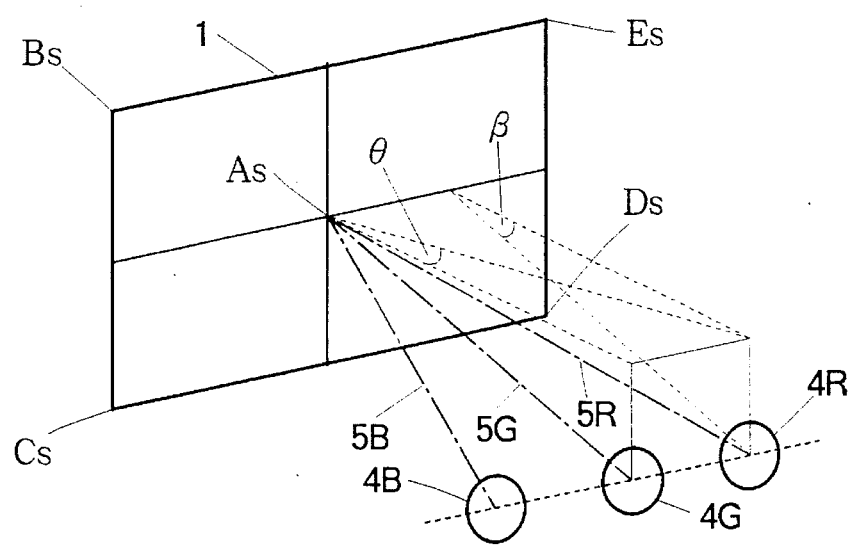
FIG. 2 is a view in perspective schematically showing the construction of the projection display apparatus in FIG. 1.

FIGS. 1 and 2 show the construction of a projection display apparatus of Embodiment 1, wherein FIG. 1 is a schematic plan view and FIG. 2 is a schematic view in perspective. As shown in FIGS. 1 and 2, the projection display apparatus of Embodiment 1 comprises a screen 1 having an aspect ratio of 4:3 for displaying an image, a red image projecting part 2R that projects a red image on the screen 1, a green image projecting part 2G that projects a green image on the screen 1, and a blue image projecting part 2B that projects a blue image on the screen 1. The red image projecting part 2R comprises a CRT 3R that displays a red image and a projecting lens assembly 4R including a plurality of lens elements (or lens groups). The green image projecting part 2G comprises a CRT 3G that displays a green image and a projecting lens assembly 4G including a plurality of lens elements (or lens groups). The blue image projecting part 2B comprises a CRT 3B that displays a blue image and a projecting lens assembly 4B comprising a plurality of lens elements (or lens groups).

The red projecting lens assembly 4R is disposed to the right side of the screen 1 when seen head-on (upper side in FIG. 1) so that its optical axis 5R is incident with a convergence angle θ on the center $A_s$ of the screen 1. The green projecting lens assembly 4G is disposed in front of the screen 1 so that its optical axis 4G is incident with no convergence angle (i.e. so that the convergence angle θ is 0°) on the center $A_s$ of the screen 1. The blue projecting lens assembly 4B is disposed to the left side of the screen 1 when seen head-on (lower side in FIG. 1) so that its optical axis 5B is incident with a convergence angle θ on the center $A_s$ of the screen 1. Further, the image projecting parts 2R, 2G and 2B are each disposed at a lower position than the center $A_s$ of the screen 1 so that the optical axes 5R, 5G and 5B are incident at an elevation angle β with respect to the horizontal plane perpendicular to the screen 1. It should however be understood that the projection display apparatus shown in FIGS. 1 and 2 is only one example of an apparatus to which this invention may be applied, and provided that such an apparatus comprises at least one image projecting part, the invention may also be applied to different designs wherein for example there is no elevation angle β, or the convergence angle θ is different on the left and on the right.

Figure 3:
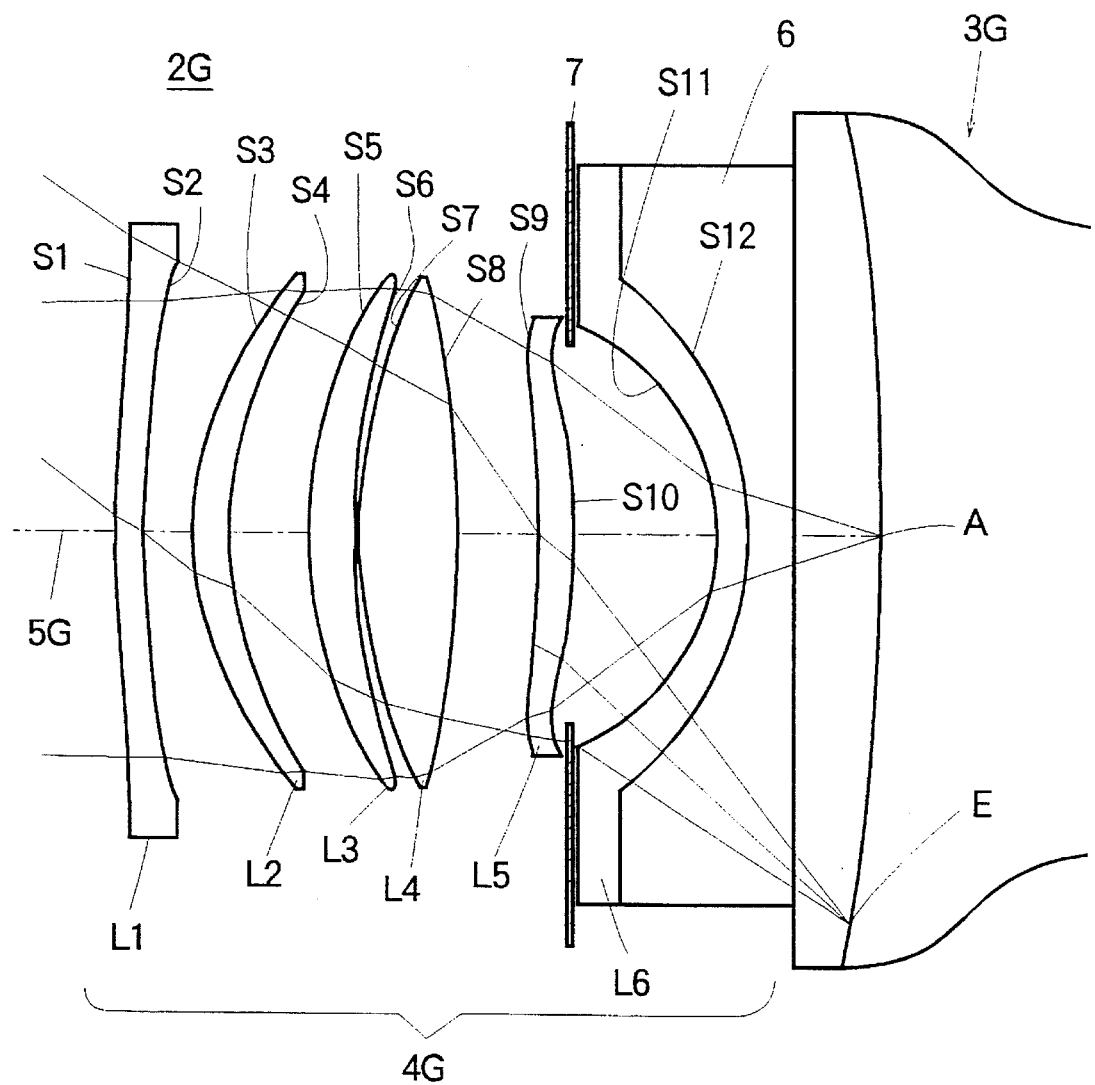
FIG. 3 is a diagram schematically showing the green image projecting part 2G of the projection display apparatus according to Embodiment 1.

FIG. 3 is a diagram schematically showing a case wherein this invention is applied to the green image projecting part 2G. As shown in FIG. 3, the green image projecting part 2G comprises the CRT 3G, the projecting lens assembly 4G and the cooling fluid 6. A light-obstructing plate 7, which is the characteristic feature of this invention, is provided in the projecting lens assembly 4G.

As in the case of the apparatus described in Japanese Patent Kokai Publication No. 258575/1994, the projecting lens assembly 4G comprises six lens elements (or six lens groups) $L_1$–$L_6$. The first lens element $L_1$ has a positive meniscus shape, both of its surfaces being non-spherical, and has a convex surface facing the screen 1 (on the left of FIG. 3). The first lens element $L_1$ has a positive power in the vicinity of the optical axis 5G, this power becoming negative toward the periphery. The second lens element $L_2$ has a positive meniscus, both of its surfaces being non-spherical, and has a convex surface facing the screen 1. The third lens element $L_3$ has a positive meniscus shape with its convex surface facing the screen 1. The fourth lens element $L_4$ is disposed adjacent to the third lens element $L_3$, both of its surfaces being non-spherical. The fifth lens element $L_5$ has a positive meniscus shape, both of its surfaces being non-spherical, and its concave surface faces the screen 1. The sixth lens element $L_6$ has a strongly concave and non-spherical surface facing the screen. In FIG. 3, $S_1$–$S_{12}$ indicate the surfaces of the lens elements $L_1$–$L_6$. The arrangement of lens elements in FIG. 3 is only one example of a projecting lens assembly to which this invention can be applied. The invention may also be applied to various types of the projecting lens assemblies wherein the number of lens elements is not six, or the performances of the lens elements are different.

Figure 4:
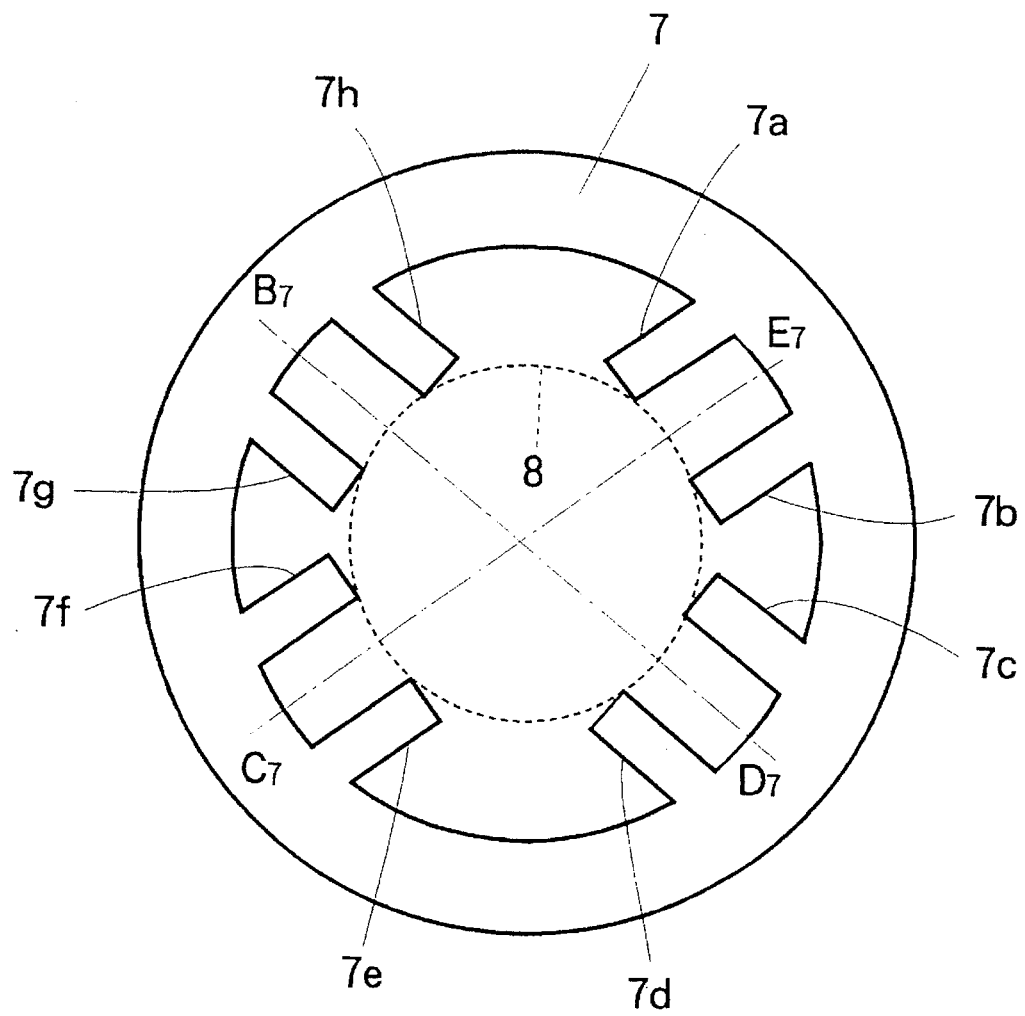
FIG. 4 is a front view of the light-obstructing plate 7 when viewed from the side of the CRT.

FIG. 4 is a front view of the light-obstructing plate 7 when viewed from the side of the CRT 3G. The light-obstructing plate 7 is disposed near the lens element $L_6$ which is closest to the CRT 3G. It is preferred that the light-obstructing plate 7 is disposed in a position that satisfies the relation $0.1 \leq R_1/R_2 \leq 0.8$, where $R_1$ is the radius of an optical-axis light 8 that is emitted toward the screen 1 from a center A on the image-displaying surface of the CRT 3G through which the optical axis 5G of the projecting lens assembly 4G passes, and $R_2$ is the radius of an effective light that is emitted toward the screen 1 from the image-displaying surface of the CRT 3G. The reason for this is that, if $R_1/R_2$ is less than 0.1 (i.e. the light-obstructing plate 7 is too close to the CRT 3G), the diameter of the peripheral light emitted from the vicinity of four corners of said image-displaying surface of the CRT 3G is too small, and it is therefore difficult to position protrusions so as to effectively remove only flare and from the peripheral light. On the other hand, if $R_1/R_2$ exceeds 0.8 (i.e. the light-obstructing plate 7 is too far from the CRT 3G), the region, where the optical-axis light and the peripheral light are superposed, becomes larger, so it is again difficult to selectively obstruct only flare.

The light-obstructing plate 7 is provided with rectangular protrusions $7a-7h$ disposed at symmetrical positions about the reference line $B_7D_7$ or $C_7E_7$ on the right-obstructing plate 7, so as to obstruct flare emitted from the vicinity of the four corners of the CRT 3G and consisting of a pair of flare beams traveling towards positions at the same distance from the reference line $B_7D_7$ or $C_7E_7$ on the plate 7 (see FIG. 4). The reference lines $BTD_7$ and $C_7E_7$ correspond to diagonals $B_sD_s$ and $C_sE_s$ on the screen 1 (see FIG. 1 or FIG. 2), respectively.

Figure 5A:
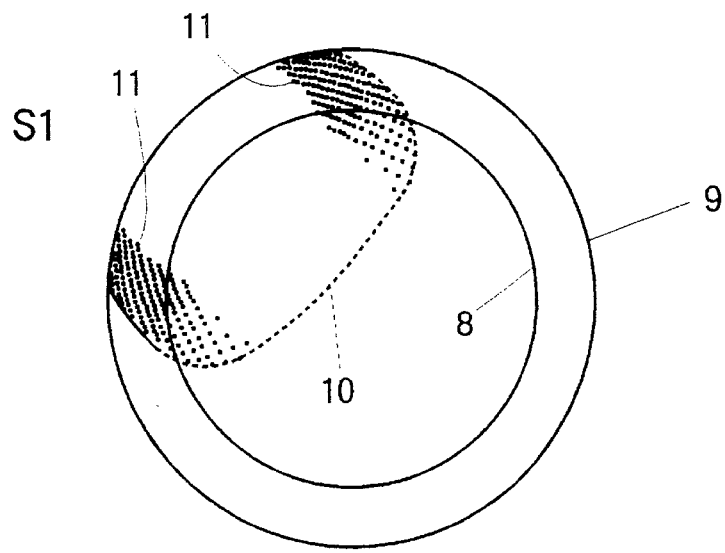
FIGS. 5A, 5B and 5C are respectively diagrams depicting flare on a surface $S_1$ of a lens $L_1$, a surface $S_8$ of a lens $L_4$ and a surface $S_{10}$ of a lens $L_5$.
Figure 5B:
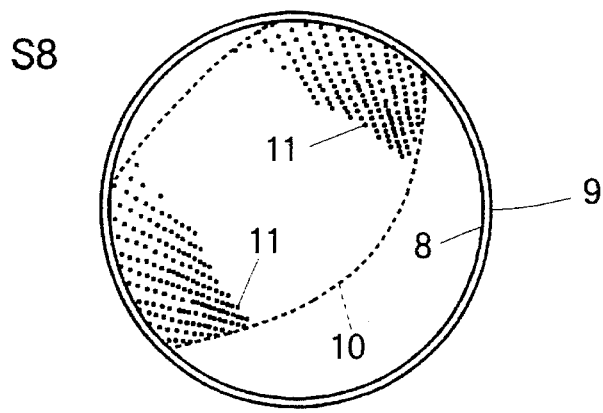
Figure 5C:
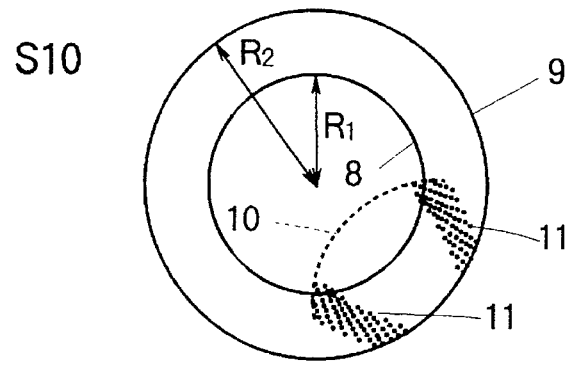

FIGS. 5A, 5B and 5C show the results of analyzing the distribution of flare comprising a pair of flare beams 11 traveling toward the vicinity of the corner $B_s$, which is one of the four corners of the screen 1. FIG. 5A shows a pair of flare beams 11 on the surface $S_1$ of the lens element $L_1$, FIG. 5B shows the pair of flare beams 11 on the surface $S_8$ off the lens element $L_4$, and FIG. 5C shows the pair of flare beams 11 on the surface $S_{10}$ of the lens element $L_5$. In FIGS. 5A, 5B and 5C, a numeral 8 designates a optical-axis light transmittance region through which the optical-axis light passes, 9 designates a effective light transmittance region through which the effective light passes, and 10 designates a light transmittance region through which the light traveling towards the corners of the screen 1 passes.

Figure 6:
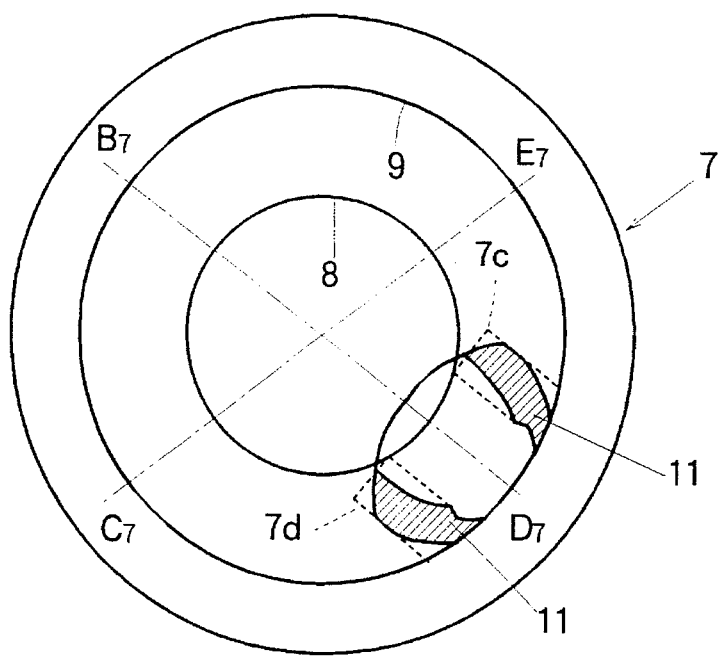
FIG. 6 is a diagram showing the relation between the protrusions 7c and 7d of the light-obstructing plate 7 and flare 11 (hatched area) according to Embodiment 1.

FIG. 6 shows the appearance of that part of the flare beam 11 in the vicinity of the surface $S_{10}$ of the lens element $L_5$ (hatched part), that is travelling toward the vicinity of the corner $B_s$ of the screen 1, when viewed from the CRT 3G. The rectangular areas shown by the broken lines are the light-obstructing regions that should be set to selectively obstruct the flare beams 11 shown by the hatched parts, i.e. these areas correspond to the positions of the protrusions $7c$ and $7d$.

Figure 7:
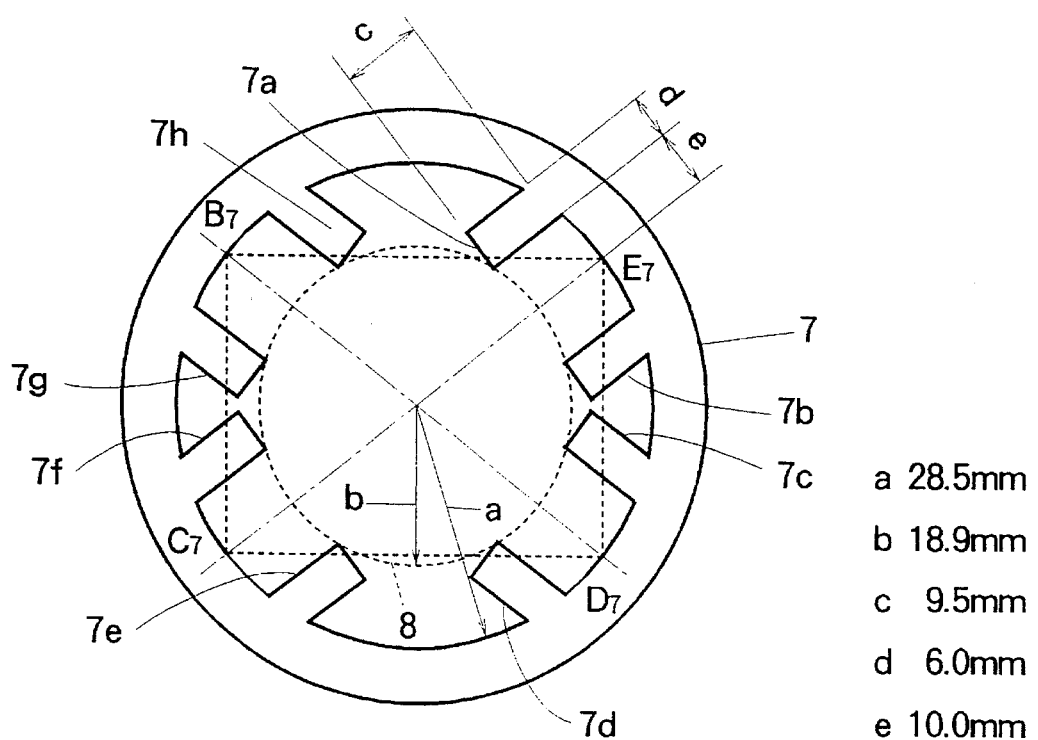
FIG. 7 is a diagram showing typical dimensions of the protrusions of the light-obstructing plate 7 according to Embodiment 1.

FIG. 7 shows typical dimensions of the protrusions $7a-7h$ of the light-obstructing plate 7. $a=28.5$ [mm] where "a" is the inner diameter of the light-obstructing plate 7; $b=18.9$ [mm] where "b" is the distance to the tip of the protrusion $7a$ and equals to the diameter $R_1$ of the optical-axis light; $c=9.5$ [mm] where "c" is the length of the protrusion $7a$; $d=6.0$ [mm] where "d" is the width of the protrusion; and $e=10.0$ [mm] where "e" is the distance between the reference line $C_7E_7$ and the protrusion $7a$. According to this embodiment, the dimensions of the other protrusions $7b-7h$ are the same as those of the protrusion $7a$.

Figure 8:
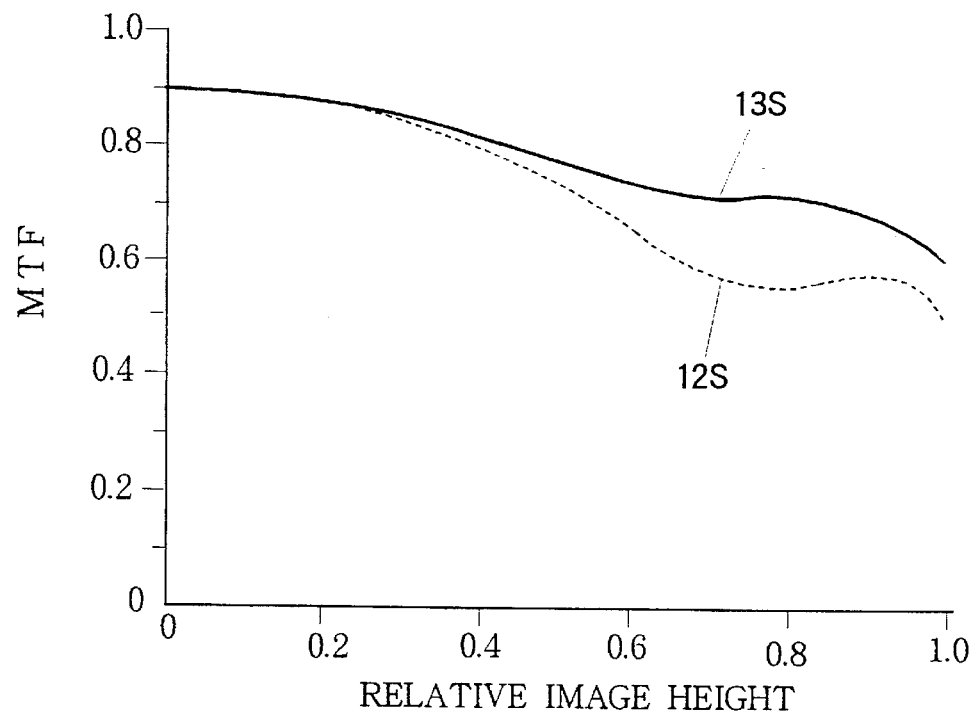
FIG. 8 is a diagram showing the result of the examination, performed by means of a simulation, of MTF characteristics in the sagittal direction of the image projecting part according to Embodiment 1.

FIG. 8 shows the results of examining, by means of a simulation, MTF characteristics in the sagittal direction of the image projecting part 2G. The horizontal axis represents the relative image height from the center $A_s$ to a diagonal corner of the screen 1, and the vertical axis represents the MTF. The curve 12S shown by the broken line in the figure represents the MTF characteristics when the light-obstructing plate 7 is not provided (example for comparison), and the curve 13S shown by the solid line represents the MTF characteristics when the light-obstructing plate 7 is provided (the present Embodiment 1). From FIG. 8 it is seen that according to Embodiment 1, selective light obstruction improves the MTF by at least 20%.

According to the apparatus of Embodiment 1 having the aforesaid construction, the image projecting part 2G for displaying the green image is provided with the light-obstructing plate 7 so as to selectively obstruct the flare beams 11. The flare reaching the four corners of the screen 1 is thereby reduced, hence the peripheral resolution and contrast are improved. Moreover, the light-obstructing plate 7 installed in the projecting lens assembly 4G is disposed in a position satisfying the relation $0.1 \leq R_1/R_2 \leq 0.8$ so as to selectively obstruct only the flare advancing toward the periphery of the screen 1, and it is formed in such a shape as to selectively obstruct only the flare. The decrease of light flux apart from flare is therefore extremely small, and the decrease of brightness on the screen 1 may be kept small. Still further, according to this Embodiment 1, the protrusions $7a-7h$ of the light-obstructing plate 7 do not obstruct any of the optical-axis light 8, so they do not cause any decrease of brightness in the middle region of the screen 1.

In the aforesaid description, this invention has been described with reference to its application to the image projecting part 2G for green. However, the construction shown in FIG. 3 and FIG. 4 may also be applied to the image projecting part 2R for red and the image projecting part 2B for blue. The question of which image projecting part the light-obstructing plate 7 of this invention should be applied to, may be freely decided according to the required projected image.

Further, the case has been described wherein the light-obstructing plate 7 does not obstruct any of the optical-axis light, as shown in FIG. 4, however the protrusions may be given such a form as to obstruct part of the optical-axis light 8 if it is more important to prevent deterioration of image quality due to flare than prevent deterioration due to decrease of brightness of the projected image.

Embodiment 2

Figure 9:
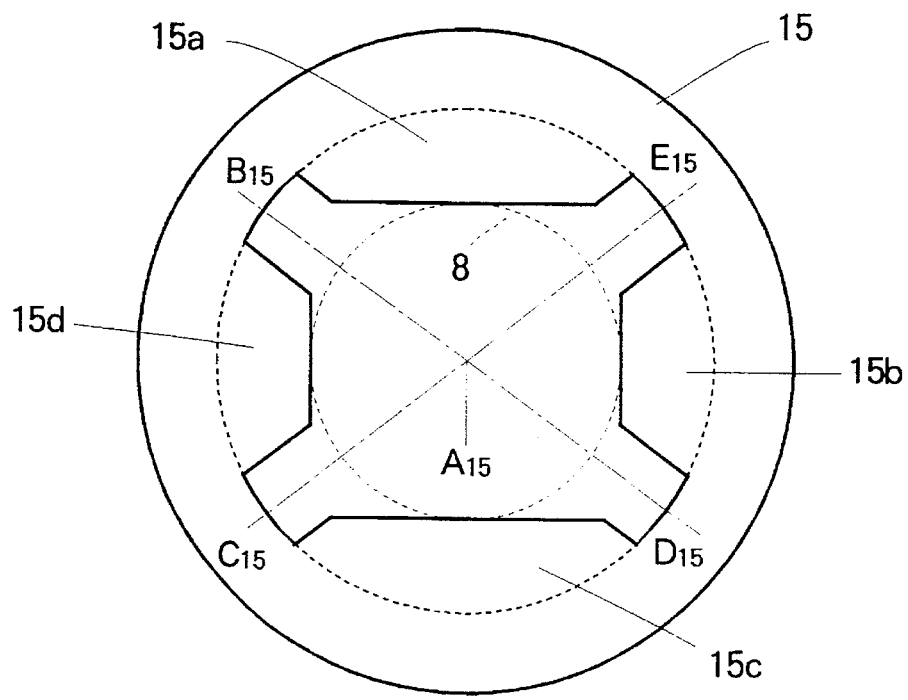
FIG. 9 is a front view of a light-obstructing plate 15, viewed from the CRT, in the image projecting part of a projection display apparatus according to Embodiment 2.

FIG. 9 is a front view of a light-obstructing plate 15 provided in an image projecting part of a projection display apparatus according to Embodiment 2, when viewed from the CRT. This light-obstructing plate 15 comprises an effectively annular base, and four protrusions $15a-15d$ having an effectively trapezoidal shape on the inner side of the annular base. The protrusions $15a-15d$ are provided above and below, and to the left and right of, the intersection $A_{15}$ between two reference lines $B_{15}D_{15}$ and $C_{15}E_{15}$ on the light-obstructing plate 15, which respectively correspond to diagonals $B_sD_s$ and $C_sE_s$ on the screen 1. The distance from the reference line $B_{15}D_{15}$ to the protrusion $15a$ is equal to that from the reference line $B_{15}D_{15}$ to the protrusion $15d$, and the distance from the reference line $B_{15}D_{15}$ to the protrusion $15b$ is equal to that from the reference line $B_{15}D_{15}$ to the protrusion $15c$. Similarly, the distance from the reference line $C_{15}E_{15}$ to the protrusion $15a$ is equal to that from the reference line $C_{15}E_{15}$ to the protrusion $15d$, and the distance from the reference line $C_{15}E_{15}$ to the protrusion $15b$ is equal to that from the reference line $C_{15}E_{15}$ to the protrusion $15c$. According to Embodiment 2, the protrusions $15a$–$15d$ are formed in such a size that they do not obstruct any of the optical-axis light 8, so there is no decrease of brightness in the vicinity of the center $A_s$ of the screen 1. Further, as the light-obstructing plate 15 of Embodiment 2 has a simpler construction than that of Embodiment 1, machining of the light-obstructing plate is easily accomplished, and the apparatus is easy to manufacture. The remaining points are identical to those of Embodiment 1.

Embodiment 3

Figure 10:
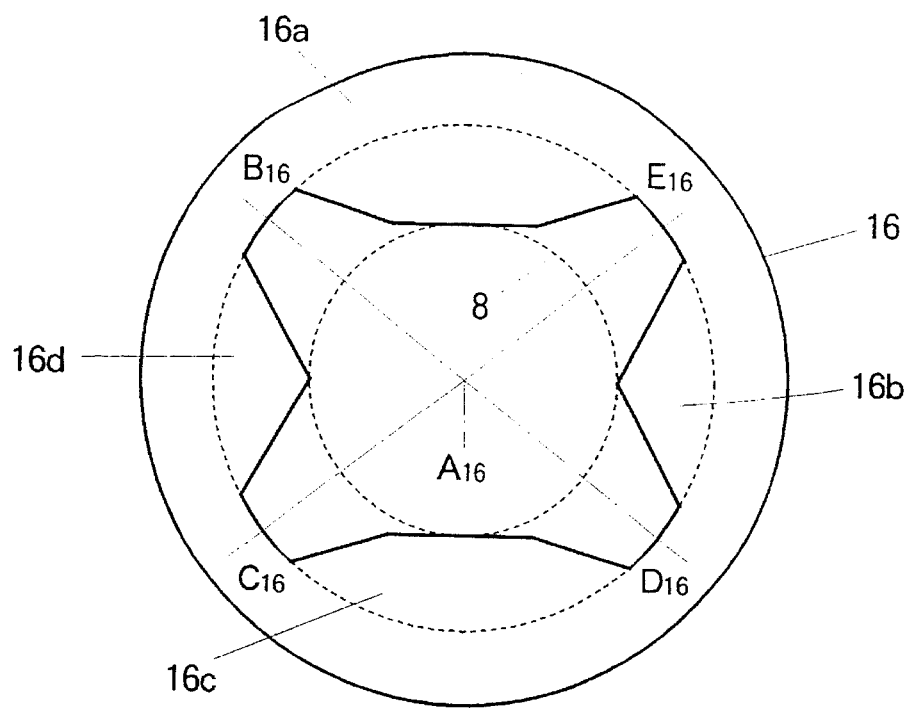
FIG. 10 is a front view of a light-obstructing plate 16, viewed from the CRT, in the image projecting part of a projection display apparatus according to Embodiment 3.

FIG. 10 is a front view of a light-obstructing plate 16 fitted to an image projecting part of a projection display apparatus according to Embodiment 3, when viewed from the CRT. This light-obstructing plate 16 comprises an effectively annular base, and four protrusions $16a$–$16d$ on the inner side of the annular base. The protrusions $16a$, $16c$ are provided respectively above and below the intersection $A_{16}$ between two reference lines $B_{16}D_{16}$ and $C_{16}E_{16}$ on the light-obstructing plate 16, which respectively correspond to the diagonals $B_sD_s$ and $C_sE_s$ on the screen 1, and have a trapezoidal shape. On the other hand, the protrusions $16d$ and $16b$ are provided respectively to the left and right of the intersection $A_{16}$ between the two reference lines $B_{16}D_{16}$ and $C_{16}E_{16}$, and have a triangular shape. The distance from the reference line $B_{16}D_{16}$ to the protrusion $16a$ is equal to that from the reference line $B_{16}D_{16}$ to the protrusion $16d$, and the distance from the reference line $B_{16}D_{16}$ to the protrusion $16b$ is equal to that from the reference line $B_{16}D_{16}$ to the protrusion $16c$. Similarly, the distance from the reference line $C_{16}E_{16}$ to the protrusion $16a$ is equal to that from the reference line $C_{16}E_{16}$ to the protrusion $16d$, and the distance from the reference line $C_{16}E_{16}$ to the protrusion $16b$ is equal to that from the reference line $C_{16}E_{16}$ to the protrusion $16c$. According to Embodiment 3, the protrusions $16a$–$16d$ are formed in such a size that they do not obstruct any of the optical-axis light 8, so there is no decrease of brightness in the vicinity of the center of the screen 1. Further, as the light-obstructing plate 16 of Embodiment 3 has a simpler construction than that of Embodiment 1, machining of the light-obstructing plate is easily accomplished, and the apparatus is easy to manufacture. The remaining points are identical to those of Embodiment 1.

Embodiment 4

Figure 11:
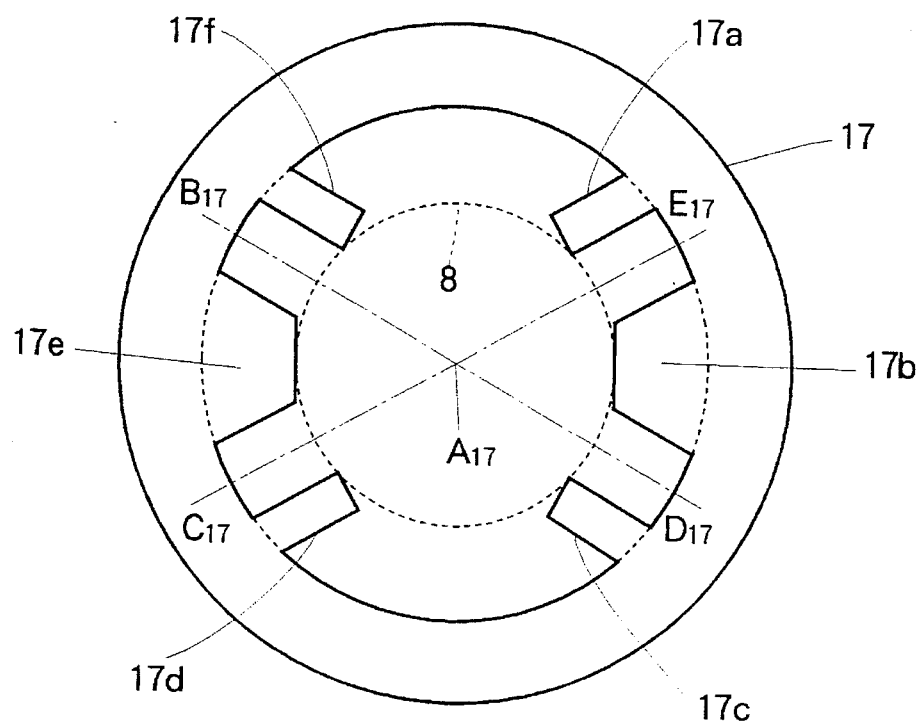
FIG. 11 is a front view of a light-obstructing plate 17, viewed from the CRT, in the image projecting part of a projection display apparatus according to Embodiment 4.

FIG. 11 is a front view of a light-obstructing plate 17 fitted to an image projecting part of a projection display apparatus according to Embodiment 4, when viewed from the CRT. This light-obstructing plate 17 is applied to a projection display apparatus wherein the aspect ratio of the screen 1 is 16:9. This light-obstructing plate 17 comprises an effectively annular base, and protrusions $17a$–$17f$ on the inner side of the annular base. The protrusions $17a$ and $17f$ consist of rectangular pieces situated above both of reference lines $B_{17}D_{17}$ and $C_{17}E_{17}$ on the light-obstructing plate 17, while the protrusions $17c$ and $17d$ consist of rectangular pieces situated below the both of reference lines $B_{17}D_{17}$ and $C_{17}E_{17}$ on the light-obstructing plate 17. Further, the protrusions $17b$ and $17e$ consist of two trapezoidally shaped pieces provided to the left and right of the intersection $A_{17}$ of the two reference lines $B_{17}D_{17}$ and $C_{17}E_{17}$ on the light-obstructing plate 17. The distance from the reference line $B_{17}D_{17}$ to the protrusion $17e$ is equal to that from the reference line $B_{17}D_{17}$ to the protrusion $17f$, and the distance from the reference line $B_{17}D_{17}$ to the protrusion $17b$ is equal to that from the reference line $B_{17}D_{17}$ to the protrusion $17c$. Similarly, the distance from the reference line $C_{17}E_{17}$ to the protrusion $17e$ is equal to that from the reference line $C_{17}E_{17}$ to the protrusion $17d$, and the distance from the reference line $C_{17}E_{17}$ to the protrusion $17a$ is equal to that from the reference line $C_{17}E_{17}$ to the protrusion $17b$.

Figure 12:
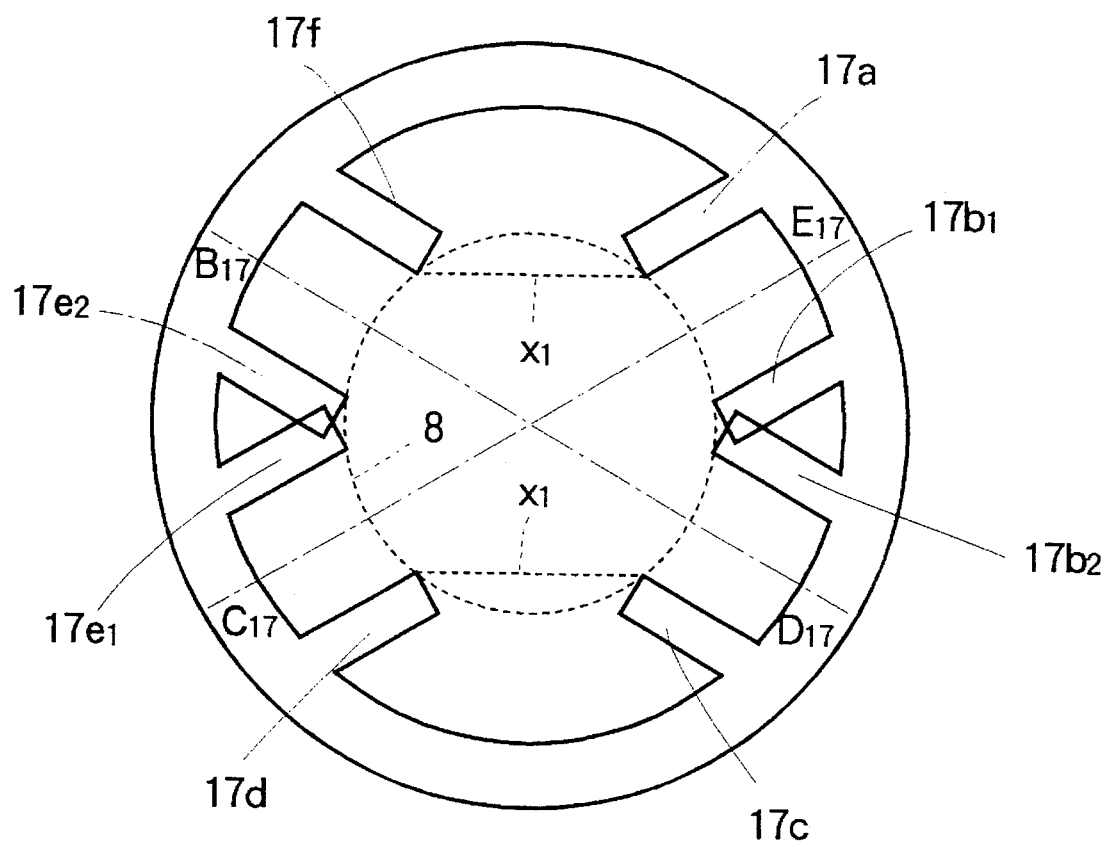
FIG. 12 is a diagram showing the reason why the light-obstructing plate 17 of Embodiment 4 is chosen when the screen aspect ratio is 16:9.

FIG. 12 is a diagram showing why the light-obstructing plate of Embodiment 4 is chosen when the screen aspect ratio is 16:9. When the aspect ratio is 16:9, if it is attempted to obstruct flare by means of eight protrusions as in Embodiment 1, the protrusions $17b_1$, $17b_2$ and the protrusions $17e_1$, $17e_2$ overlap with each other. The protrusions $17b_1$, $17b_2$ are therefore combined into one trapezoidal protrusion $17b$, and the protrusions $17e_1$, $17e_2$ are combined into one trapezoidal protrusion $17e$. The protrusions $17a$, $17f$ and $17c$, $17d$ are not joined to each other by the broken lines $X_1$ so as not to obstruct the optical-axis light 8.

According to Embodiment 4, the protrusions $17a$–$17f$ are formed in such a size that they do not obstruct any of the optical-axis light 8, so there is no decrease of brightness in the vicinity of the center of the screen 1. Further, as the light-obstructing plate 17 of Embodiment 4 has a simpler construction than that of Embodiment 1, machining of the light-obstructing plate is easily accomplished, and the apparatus is easy to manufacture. The remaining points are identical to those of Embodiment 1.

Embodiment 5

Figure 13:
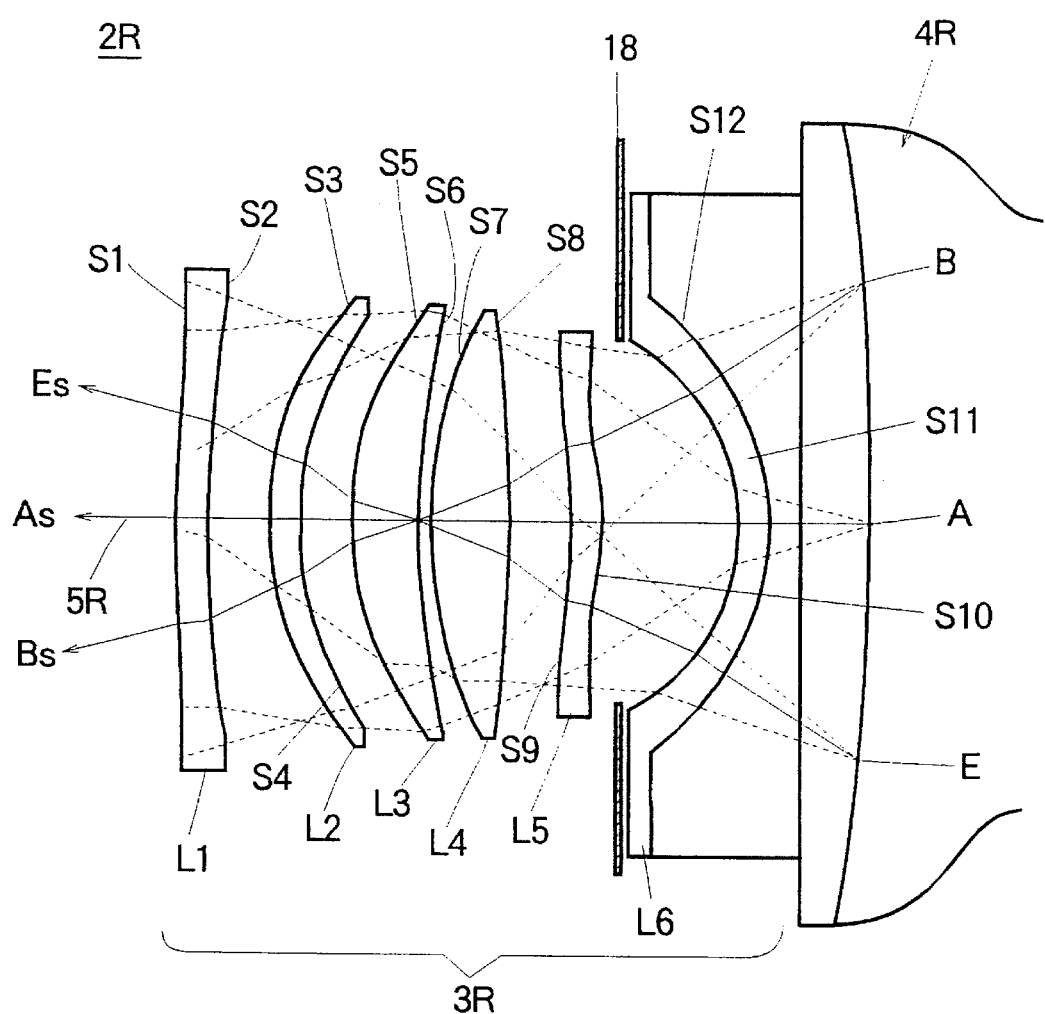
FIG. 13 is a diagram schematically showing the image projecting part 2R of a projection display apparatus according to Embodiment 5.
Figure 14:
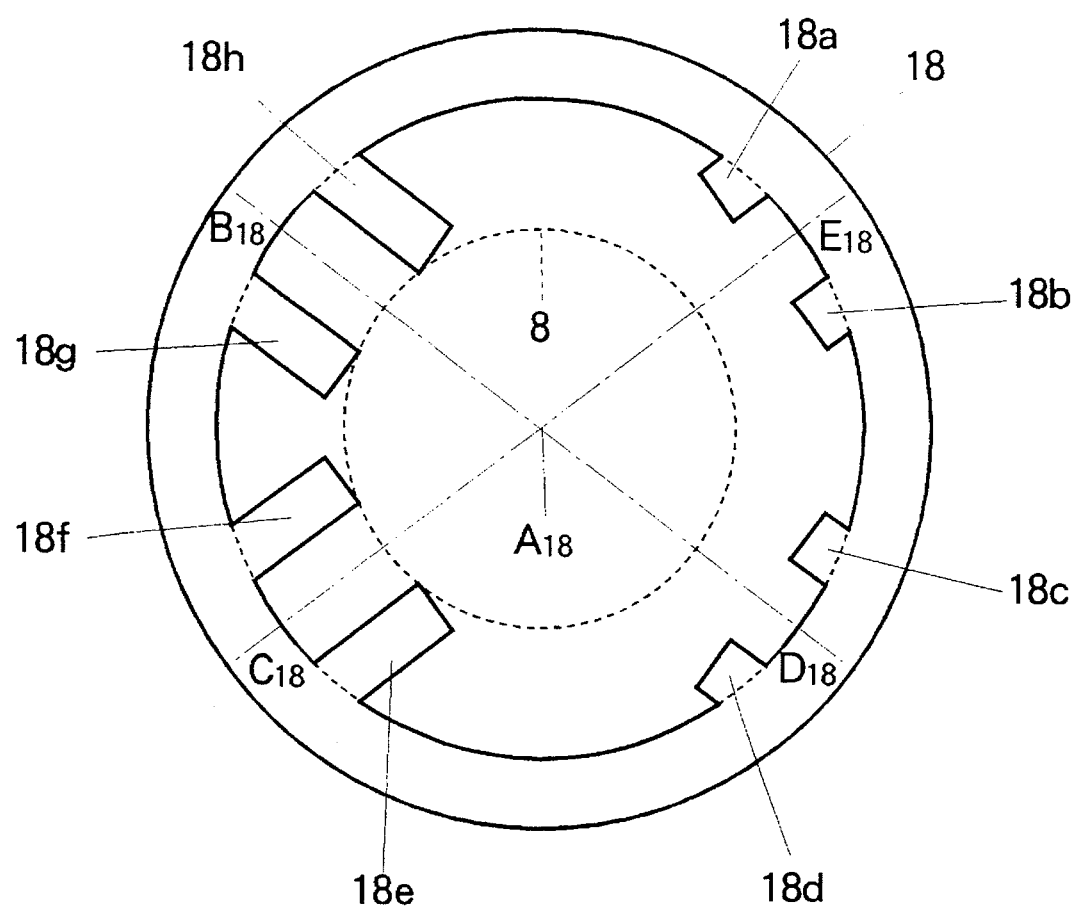
FIG. 14 is a front view of a light-obstructing plate 18, viewed from the CRT, in an image projecting part of a projection display apparatus according to Embodiment 5.

FIG. 13 is a schematic diagram showing the construction of a red image projecting part 2R in a projection display apparatus according to Embodiment 5. This red image projecting part 2R has an optical axis 5R that is obliquely incident at a convergence angle θ on the screen 1. FIG. 14 is a front view of a light-obstructing plate 18 in FIG. 3 viewed from the CRT. This light-obstructing plate 18 comprises an effectively annular base, and eight rectangular protrusions $18a$–$18h$ formed on the inner side of the annular base. Of these eight protrusions $18a$–$18h$, the four protrusions $18e$–$18h$ on the left of the intersection $A_{18}$ of two reference lines $B_{18}D_{18}$ and $C_{18}E_{18}$ on the light-obstructing plate 18 have the same shape as one another, and the four protrusions $18a$–$18d$ on the right of the intersection $A_{18}$ have the same shape as one another, the protrusions $18e$–$18h$ on the left of the intersection $A_{18}$ being formed larger than the protrusions $18a$–$18d$ on the right. Apart from the light-obstructing plate 18, the construction of the red image projecting part 2R is identical to that of the image projecting part 2G of FIG. 3 described in Embodiment 1. The distance from the reference line $B_{18}D_{18}$ to the protrusion $18h$ is equal to that from the reference line $B_{18}D_{18}$ to the protrusion $18g$, and the distance from the reference line $B_{18}D_{18}$ to the protrusion $18c$ is equal to that from the reference line $B_{18}D_{18}$ to the protrusion $18d$. Similarly, the distance from the reference line $C_{18}E_{18}$ to the protrusion $18a$ is equal to that from the reference line $C_{18}E_{18}$ to the protrusion $18b$, and the distance from the reference line $C_{18}E_{18}$ to the protrusion $18e$ is equal to that from the reference line $C_{18}E_{18}$ to the protrusion $18f$.

Figure 15:
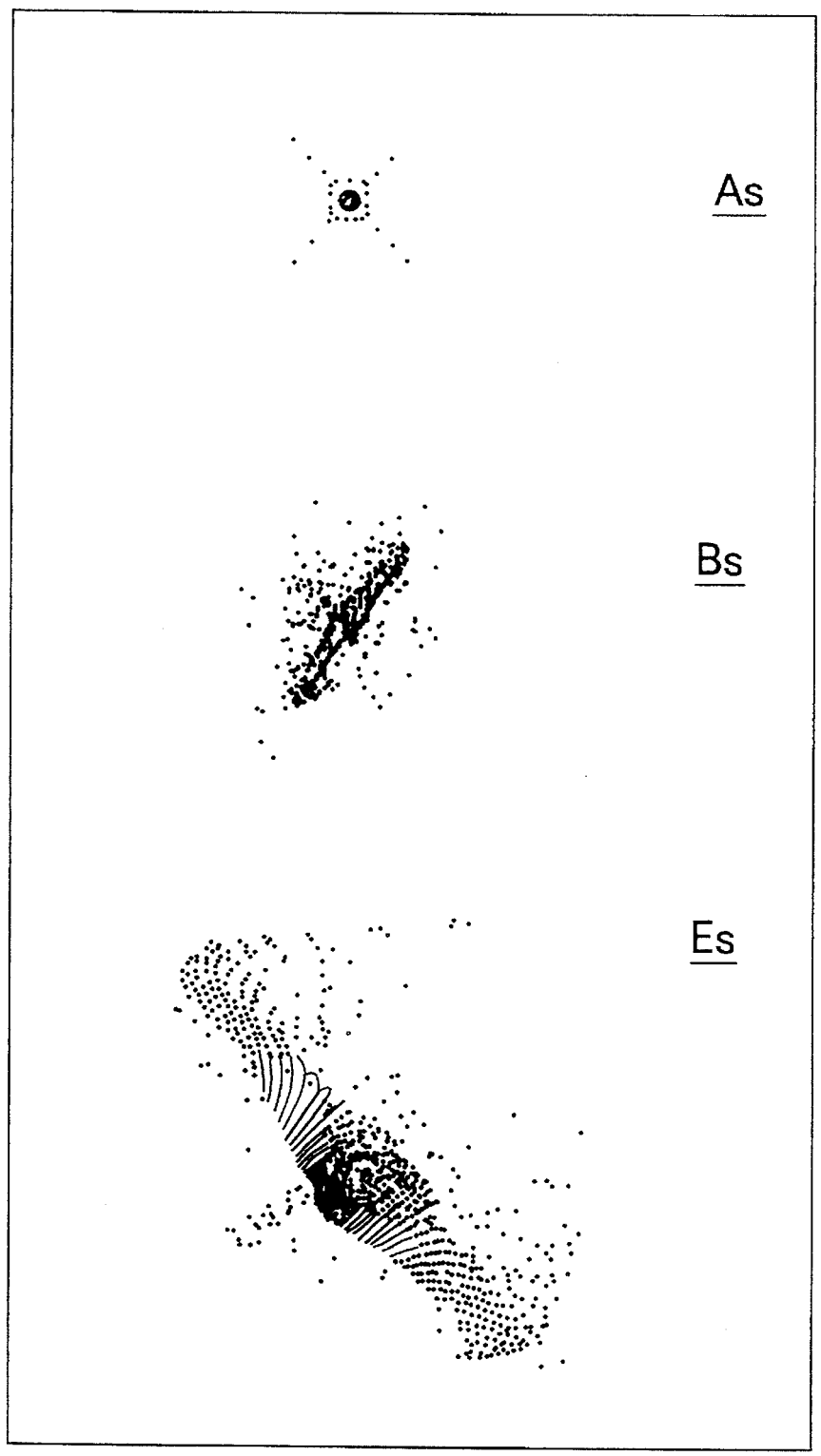
FIG. 15 is a diagram showing how spots on the CRT are deformed and widened on the screen when a light beam is incident on the screen obliquely.

The reason for having protrusions of different sizes to the left and right of the intersection $A_{18}$ of the reference lines $B_{18}D_{18}$ and $C_{18}E_{18}$ on the light-obstructing plate 18 is that spots displayed at the points A, B and E on the CRT 4R (see FIG. 13) become widened in the vicinity of the center $A_s$ and the corners $B_s$ and $E_s$ of the screen 1 in the manner shown in FIG. 15. Flare traveling to the corner regions of the screen 1 from the CRT 4R therefore occupies areas of different size to the left and right of the intersection $A_{18}$ of the two reference lines $B_{18}D_{18}$ and $C_{18}E_{18}$, as shown by the hatched parts 11 in FIG. 16.

Figure 16:
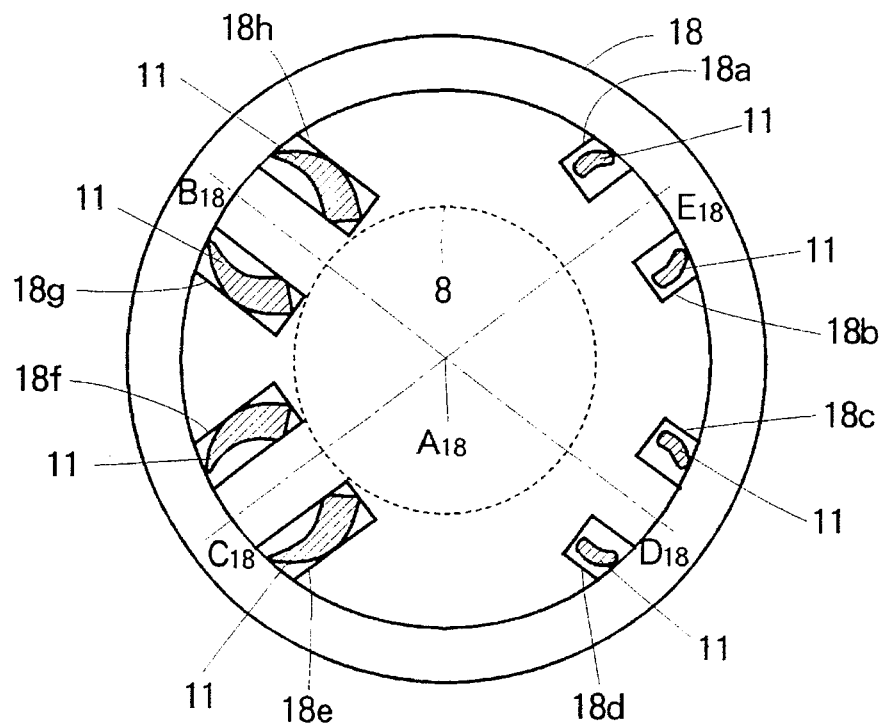
FIG. 16 is a diagram showing the relation between the protrusions of the light-obstructing plate of FIG. 14 and flare.

The sizes and positions of the protrusions 18a–18h on the light-obstructing plate 18 of Embodiment 5 are such as to obstruct only flare traveling to the four corners of the screen, as shown in FIG. 16. The flare produced at the four corners of the screen by the red light optical system is thereby reduced, and as these protrusions do not obstruct any of the light on the optical axis, there is no effect whatever on brightness near the center of the projected image. The remaining points are identical to those of the aforesaid Embodiment 1.

Although the red image projecting part has been described hereinabove, the invention may also be applied to another image projecting part provided that it has an optical axis incident on the screen 1 at a convergence angle θ. For example, in the case of the image projecting part for blue light in FIG. 1, the same effect can be obtained by using a light-obstructing plate wherein the construction of FIG. 14 is reversed on the left and right. Further, this embodiment may also be applied to two light-obstructing plates in the red image projecting part 2R and the image projecting part 2B for blue light.

Embodiment 6

Figure 17:
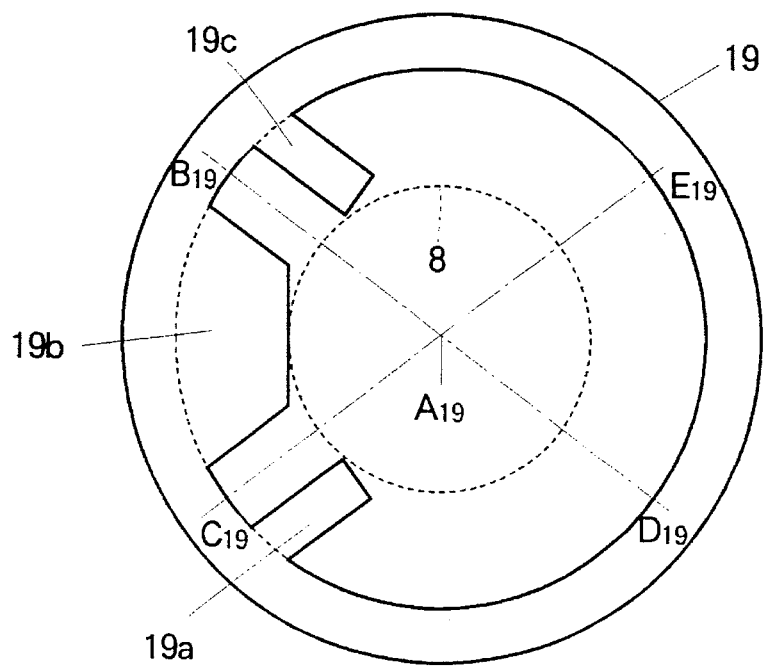
FIG. 17 is a front view of a light-obstructing plate 19, viewed from the CRT, in an image projecting part of a projection display apparatus according to Embodiment 6.

FIG. 17 is a front view of a light-obstructing plate 19 provided in a red image projecting part in a projection display apparatus of Embodiment 6. This light-obstructing plate 19 comprises an effectively annular base and three protrusions 19a–19c formed on the inner side of the annular base. Of the three protrusions 19a–19c, the protrusions 19a and 19c have the same rectangular shape, and the protrusion 19b has a trapezoidal shape. This light-obstructing plate 19 may be thought of as having the construction of the light-obstructing plate 18 of FIG. 14 excepting that the protrusions 18a–18d on the right are absent, and the protrusions 18g and 18f on the left have been joined to make one trapezoidal protrusion 19b. The distance from the reference line $C_{19}E_{19}$ to the protrusion 19a is equal to that from the reference line $C_{19}E_{19}$ to the protrusion 19b, and the distance from the reference line $B_{19}D_{19}$ to the protrusion 19c is equal to that from the reference line $B_{19}D_{19}$ to the protrusion 19b.

The light-obstructing plate 19 having the aforesaid construction is particularly effective when it is desired to obstruct only flare on the side where the flare occupies a larger area, and it has the advantage of being simpler. The remaining points are identical to those of Embodiment 5.

Embodiment 7

Figure 18:
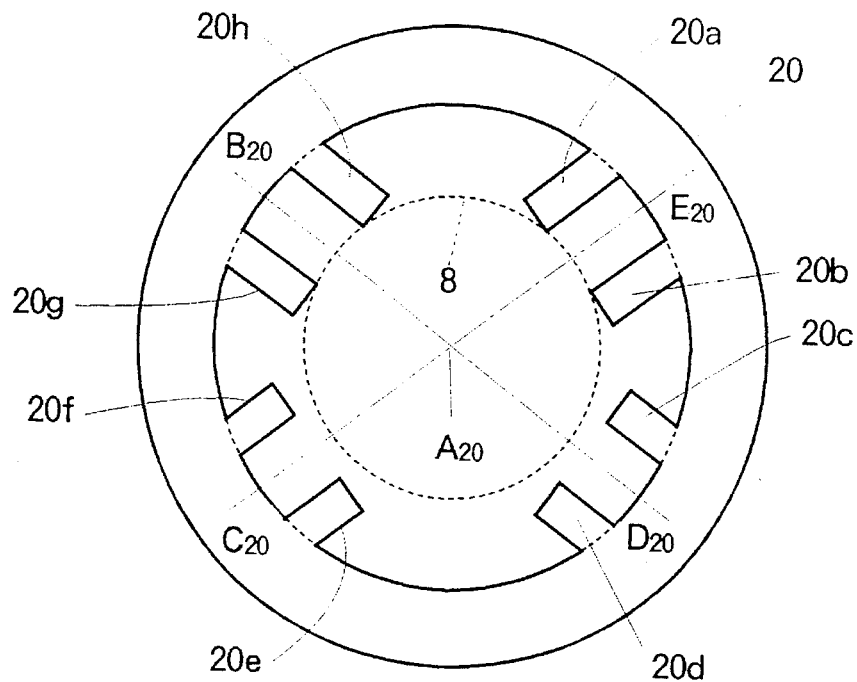
FIG. 18 is a front view of a light-obstructing plate 20, viewed from the CRT, in an image projecting part of a projection display apparatus according to Embodiment 7.

FIG. 18 is a front view of a light-obstructing plate 20 fitted to an image projecting part of a projection display apparatus according to Embodiment 7, when viewed from the CRT. This light-obstructing plate 20 is used when the optical axis of the projecting lens assembly of the image projecting part is incident on the screen with an elevation angle β. This light-obstructing plate 20 comprises an effectively annular base, and eight protrusions 20a–20h formed on the inner side of the annular base. Of these eight protrusions 20a–20h, the four protrusions 20a, 20b, 20g and 20h above the intersection $A_{20}$ of two reference lines $B_{20}D_{20}$ and $C_{20}E_{20}$ on the light-obstructing plate 20 have the same shape as one another, and the four protrusions 20c–20f below the intersection $A_{20}$ have the same shape as one another, the protrusions 20a, 20b, 20g and 20h above the intersection $A_{20}$ being formed larger than the protrusions 20c–20f below it. Apart from the light-obstructing plate 20, the construction of the image projecting part is identical to that of the image projecting part 2G described in Embodiment 1.

The reason for having protrusions of different sizes above and below the intersection $A_{20}$ of the reference lines $B_{20}D_{20}$ and $C_{20}E_{20}$ on the light-obstructing plate 20 is that spots on the CRT become widened on the screen 1. Flare traveling to the corner regions of the screen 1 from the CRT therefore occupies areas of different size above and below the intersection $A_{20}$ of the two reference lines $B_{20}D_{20}$ and $C_{20}E_{20}$.

The sizes and positions of the protrusions 20a–20h on the light-obstructing plate 20 of Embodiment 7 are such as to obstruct only flare traveling to the four corners of the screen, as shown in FIG. 18. The flare produced at the four corners of the screen is thereby reduced, and as these protrusions do not obstruct any of the optical-axis light 8, there is no effect whatever on brightness near the center of the projected image. The remaining points are identical to those of the aforesaid Embodiment 1.

The aforesaid construction may be applied to the image projecting part for red, green or blue light.

The protrusions 20c–20f in the lower part of the light-obstructing plate 20 may be dispensed with, leaving only the projections 20a, 20b, 20g and 20h in the upper part. In this case, the construction of the light-obstructing plate may be further simplified.

Embodiment 8

Figure 19:
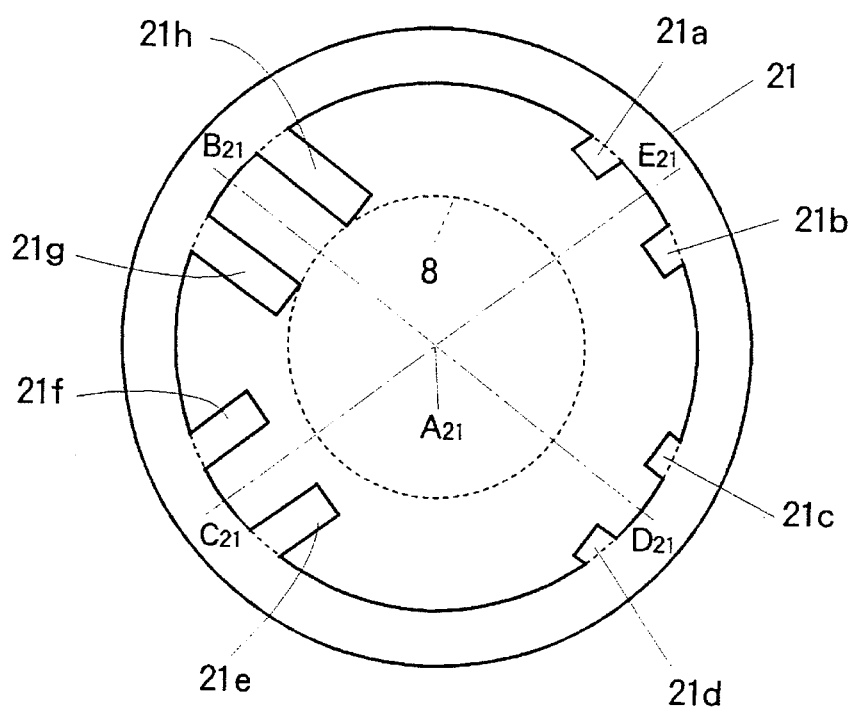
FIG. 19 is a front view of a light-obstructing plate 21, viewed from the CRT, in an image projecting part of a projection display apparatus according to Embodiment 8.

FIG. 19 is a front view of a light-obstructing plate 21 provided in an image projecting part of a projection display apparatus according to Embodiment 8, when viewed from the CRT. This light-obstructing plate 21 is used when the optical axis of the projecting lens assembly of the image projecting part is incident on the screen with an elevation angle β as shown in FIG. 2, and the optical axis of the image projecting part is incident on the screen with a convergence angle θ, as shown in FIG. 1 or FIG. 2. This light-obstructing plate 20 comprises an effectively annular base, and eight protrusions 21a–21b formed on the inner side of the annular base. Of these eight protrusions 21a–21h, the protrusions 21a and 21b on either side of one end $E_{21}$ of a reference line $C_{21}E_{21}$ have the same shape as one another, the protrusions 21c and 21d on either side of one end $D_{21}$ of a reference line $B_{21}D_{21}$ have the same shape as one another, the protrusions 21e and 21f on either side of the other end $C_{21}$ of the reference line $C_{21}E_{21}$ have the same shape as one another, and the protrusions 21g and 21h on either side of the other end $B_{21}$ of the reference line $B_{21}D_{21}$ have the same shape as one another. Of the protrusions 21a–21h, the protrusions 21g and 21h are the largest, the protrusions 21e and 21f are the next largest, the protrusions 21a and 21b are the next largest and the protrusions 21c and 21d are the smallest, as shown in FIG. 19.

The reason for arranging the sizes of the protrusions in this way is that, if the field angles of light beams traveling to the four corners $B_s$, $C_s$, $D_s$ and $E_s$ of the screen 1 are respectively $W_b$, $W_c$, $W_d$ and $W_e$ and the elevation angle β is relatively small, the relation $W_e > W_d > W_b > W_c$ holds. As a result, the magnitudes of the flare at each of the four corners of the screen 1 are then in the same order, the protrusions 21g and 21h correspond to the corner $E_s$, the protrusions 21e and 21f correspond to the corner $D_s$, the protrusions 21a and 21b correspond to the corner $B_s$, and the protrusions 21c and 21d correspond to the corner $C_s$. The sizes of the protrusions of the light-obstructing plate 21 in Embodiment 8 must be varied according to the magnitudes and positions of the convergence angle θ and elevation angle β, and to the type of projecting lens assembly.

Further, if the flare has no effect on image quality in any corner of the screen displaying the projected image, the corresponding protrusion may be omitted.

In an image projecting part having an elevation angle β such that the light is incident from above the screen 1, the same effect can be achieved by using a light-obstructing plate having a construction wherein the upper and lower parts in FIG. 19 are reversed. Similarly, in a blue image projecting part, the same effect can be achieved by using a light-obstructing plate having a construction wherein the left and right parts of the red light optical system are reversed.

Embodiment 9

In the projection display apparatus having a CRT as image source, the X rays emitted by the CRT may have a damaging effect on the human body. In the aforesaid Embodiments 1 to 8, therefore, leakage of X rays emitted by the CRT can be reduced by, for example, forming the light-obstructing plate of a metal such as iron or lead.

Embodiment 10

Figure 20:
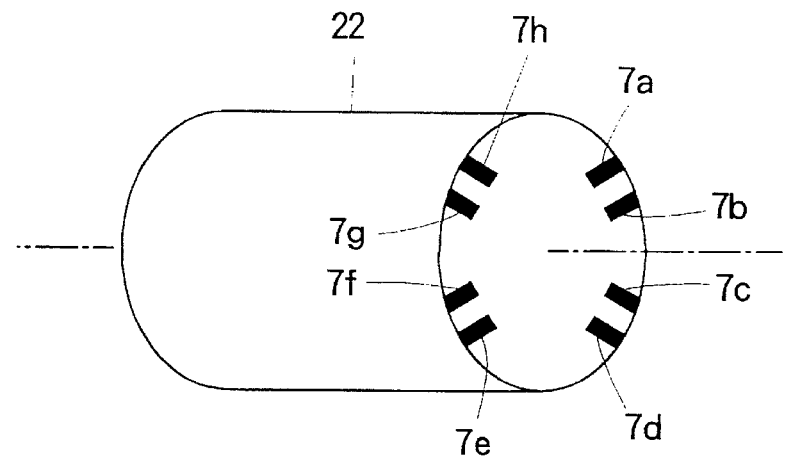
FIG. 20 is a diagram schematically showing a lens tube of a projection display apparatus of Embodiment 10.
Figure 21:
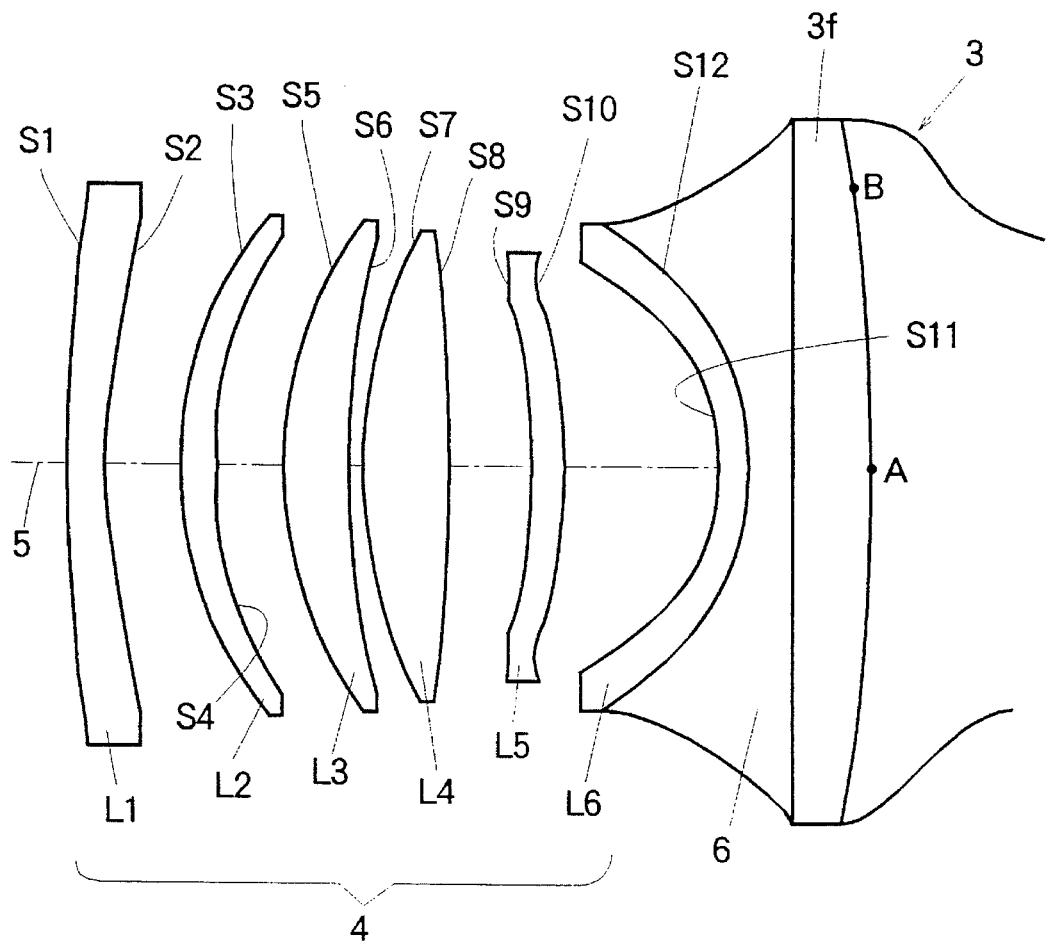
FIG. 21 is a diagram showing the construction of the image projecting part in a conventional projection display apparatus.
Figure 22:
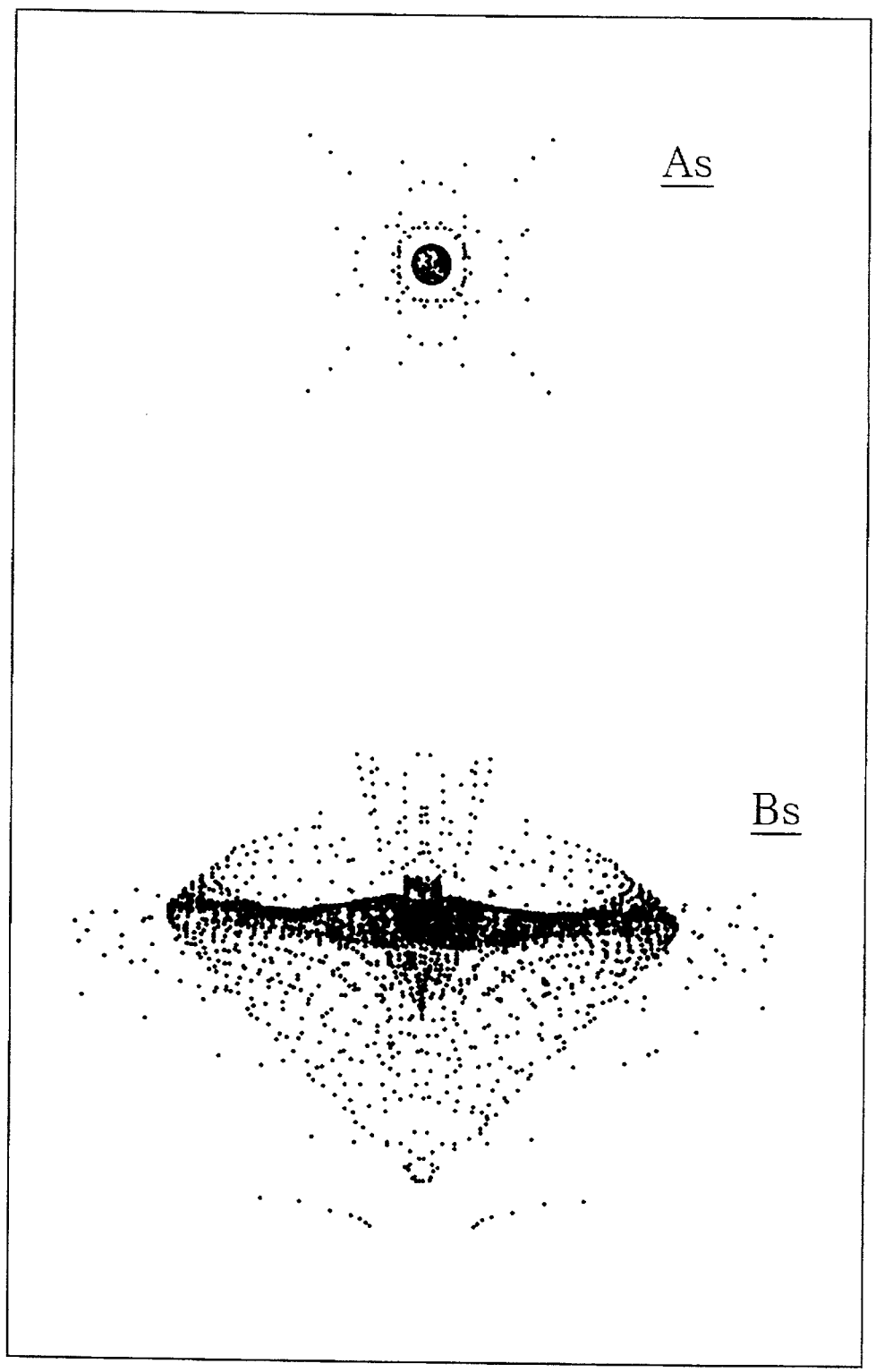
FIG. 22 is a diagram showing the appearance of a projected image found by calculation in the conventional projection display apparatus of FIG. 21.
Figure 23:
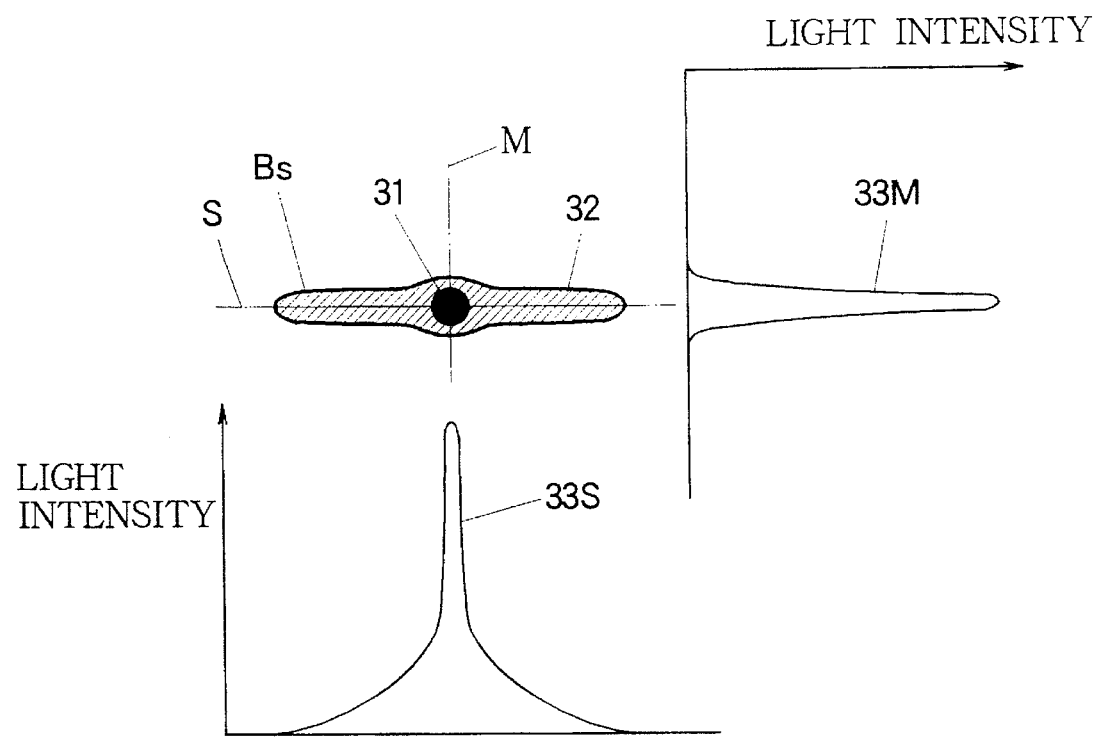
FIG. 23 is a model representation of how an image of an area $B_s$ in FIG. 22 is formed, and also shows the light intensity distributions in the meridional and sagittal directions respectively.
Figure 24:
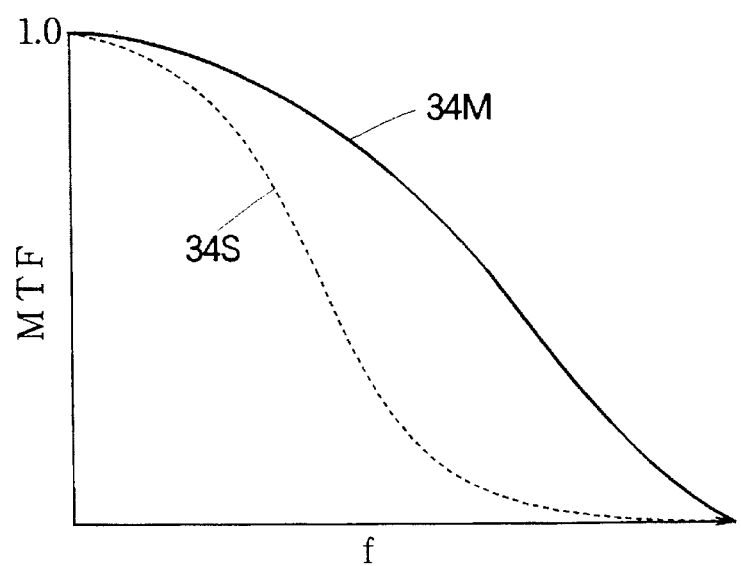
FIG. 24 is a diagram showing MTF characteristics in the meridional and sagittal directions in the conventional projection display apparatus of FIG. 21.

FIG. 20 is a diagram schematically showing a lens tube 22 of a projection display apparatus of Embodiment 10. According to the apparatus of Embodiment 10, the projecting lens assembly is installed in the lens tube 22, and protrusions 7a–7h are formed in a one-piece construction at the end of the lens tube 22 closer to the CRT (on the right of FIG. 20) so as to obstruct flare in the light traveling to the four corners of the screen 1. This lens tube 22 may be applied to any of the aforesaid Embodiments 1 to 9.

What is claimed is:

1. A projection display apparatus comprising:

an image source having a rectangular image-displaying surface, on which an image is formed;

a projecting lens assembly, which includes a plurality of lens elements, for magnifying said image formed by said image source and projecting said image onto a screen; and light-obstructing means disposed in the vicinity of the nearest lens element of said projecting lens assembly to said image source;

wherein said light-obstructing means is disposed in such a position that $0.1 \leq R_1/R_2 \leq 0.8$ where $R_1$ is a radius of optical-axis light which is emitted toward said screen from a center on said image-displaying surface through which the optical axis of said projecting lens assembly passes, and $R_2$ is a radius of effective aperture; and wherein said light-obstructing means is provided with protrusions which are disposed at positions at a same distance from a first or a second reference line on said light-obstructing means so as to obstruct several pairs of flare beams, which are included in peripheral light emitted from the vicinity of four corners of said image-displaying surface and are traveling towards positions at a same distance from said first or said second reference line, said first and said second reference lines corresponding to two diagonals on said screen respectively.

2. A projection display apparatus as defined in claim 1, wherein said protrusions obstruct only a part of said effective light, said part not including said optical-axis light.

3. A projection display apparatus as defined in claim 1, wherein said protrusions comprise first to fourth pairs of rectangular parts, said first pair being disposed on both sides of an end of said first reference line when viewed from said image source, said second pair being disposed on both sides of the other end of said first reference line when viewed from said image source, said third pair being disposed on both sides of an end of said second reference line when viewed from said image source, and said fourth pair being disposed on both sides of the other end of said second reference line when viewed from said image source.

4. A projection display apparatus as defined in claim 1, wherein said protrusions comprise four trapezoidal parts respectively disposed above, below and to the left and right of an intersection of said first and said second reference lines on said light-obstructing means when viewed from said image source.

5. A projection display apparatus as defined in claim 1, wherein said protrusions comprise two trapezoidal parts respectively disposed above and below an intersection of said first and said second reference lines on said light-obstructing means, and two triangular parts respectively disposed to the left and right of said intersection when viewed from said image source.

6. A projection display apparatus as defined in claim 1, wherein said protrusions comprise two rectangular parts provided above both of said first and said second reference lines on said light-obstructing means, two rectangular parts provided below both of said first and said second reference lines on said light-obstructing means, and two trapezoidal parts respectively provided to the left and right of an intersection of said first and said second reference lines on said light-obstructing means, when viewed from said image source.

7. A projection display apparatus as defined in claim 1, wherein said protrusions are of different sizes to the left and right of an intersection of said first and second reference lines on said light-obstructing means when viewed from said image source.

8. A projection display apparatus as defined in claim 1, wherein said protrusions are provided only on the left or right of an intersection of said first and second reference lines on said light-obstructing means when viewed from said image source.

9. A projection display apparatus as defined in claim 1, said protrusions are of different size above and below an intersection of said first and said second reference lines on said light-obstructing means when viewed from said image source.

10. A projection display apparatus as defined in claim 1, wherein said protrusions are provided only above or below an intersection of said first and said second reference lines on said light-obstructing means when viewed from said image source.

11. A projection display apparatus as defined in claim 1, wherein said protrusions are of different sizes above and below an intersection of said first and second reference lines on said light-obstructing means, and to the left and right of said intersection, when viewed from said image source.

12. A projection display apparatus as defined in claim 1, wherein said light-obstructing means is formed from a metal plate.

13. A projection display apparatus as defined in claim 1, further comprising a lens tube for forming an envelope for said projecting lens, wherein said light-obstructing means is formed in a one-piece construction with said lens tube.

14. A projection display apparatus for displaying a color image on a screen, comprising a red image projecting part for projecting a red image on said screen, a green image projecting part for projecting a green image on said screen, and a blue image projecting part for projecting a blue image on said screen;

- at least one of said red image projecting part, said green image projecting part and said blue image projecting part comprising:
- an image source having a rectangular image-displaying surface, on which an image is formed;
- a projecting lens assembly, which includes a plurality of lens elements, for magnifying said image formed by said image source and projecting said image onto a screen; and
- light-obstructing means disposed in the vicinity of the nearest lens elements of said projecting lens assembly to said image source;
- wherein said light-obstructing means is disposed in such a position that $0.1 \leq R_1/R_2 \leq 0.8$ where $R_1$ is a radius of optical-axis light which is emitted toward said screen from a center on said image-displaying surface through which the optical axis of said projecting lens assembly passes, and $R_2$ is a radius of effective aperture; and
- wherein said light-obstructing means is provided with protrusions which are disposed at positions at a same distance from a first or a second reference line on said light-obstructing means so as to obstruct several pairs of flare beams, which are included in peripheral light emitted from the vicinity of four corners of said image-displaying surface and are traveling towards positions at a same distance from said first or said second reference line, said first and said second reference lines corresponding to two diagonals on said screen respectively.

15. A projection display apparatus as defined in claim 14, wherein said protrusions obstruct only a part of said effective light, said part not including said optical-axis light.

16. A projection display apparatus as defined in claim 14, wherein said protrusions comprise first to fourth pairs of rectangular parts,

- said first pair being disposed on both sides of an end of said first reference line when viewed from said image source,
- said second pair being disposed on both sides of the other end of said first reference line when viewed from said image source,
- said third pair being disposed on both sides of an end of said second reference line when viewed from said image source, and
- said fourth pair being disposed on both sides of the other end of said second reference line when viewed from said image source.

17. A projection display apparatus as defined in claim 14, wherein said protrusions comprise four trapezoidal parts respectively disposed above, below and to the left and right of an intersection of said first and said second reference lines on said light-obstructing means when viewed from said image source.

18. A projection display apparatus as defined in claim 14, wherein said protrusions comprise two trapezoidal parts respectively disposed above and below an intersection of said first and said second reference lines on said light-obstructing means, and two triangular parts respectively disposed to the left and right of said intersection when viewed from said image source.

19. A projection display apparatus as defined in claim 14, wherein said protrusions comprise two rectangular parts provided above both of said first and said second reference lines on said light-obstructing means, two rectangular parts provided below both of said first and said second reference lines on said light-obstructing means, and two trapezoidal parts respectively provided to the left and right of an intersection of said first and said second reference lines on said light-obstructing means, when viewed from said image source.

20. A projection display apparatus as defined in claim 14, wherein said protrusions are of different sizes to the left and right of an intersection of said first and second reference lines on said light-obstructing means when viewed from said image source.

21. A projection display apparatus as defined in claim 14, wherein said protrusions are provided only on the left or right of an intersection of said first and second reference lines on said light-obstructing means when viewed from said image source.

22. A projection display apparatus as defined in claim 14, said protrusions are of different size above and below an intersection of said first and said second reference lines on said light-obstructing means when viewed from said image source.

23. A projection display apparatus as defined in claim 14, wherein said protrusions are provided only above or below an intersection of said first and said second reference lines on said light-obstructing means when viewed from said image source.

24. A projection display apparatus as defined in claim 14, wherein said protrusions are of different sizes above and below an intersection of said first and second reference lines on said light-obstructing means, and to the left and right of said intersection, when viewed from said image source.

25. A projection display apparatus as defined in claim 14, wherein said light-obstructing means is formed from a metal plate.

26. A projection display apparatus as defined in claim 14, further comprising a lens tube for forming an envelope for said projecting lens, wherein said light-obstructing means is formed in a one-piece construction with said lens tube.

* * * * *